United States Patent
Linch et al.

(10) Patent No.: US 10,032,445 B1
(45) Date of Patent: Jul. 24, 2018

(54) HONEYCOMB UNIT CELL ACOUSTIC METAMATERIAL WITH IN SITU BUTTRESSES FOR TUNED ACOUSTIC FREQUENCY ATTENUATION

(71) Applicant: Northrop Grumman Systems Corporation, Falls Church, VA (US)

(72) Inventors: Jonathon J. Linch, Los Angeles, CA (US); Scott R. Sorbel, Redondo Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 126 days.

(21) Appl. No.: 15/376,798

(22) Filed: Dec. 13, 2016

(51) Int. Cl.
  *G10K 11/172* (2006.01)
  *B32B 3/12* (2006.01)
  *G10K 11/168* (2006.01)

(52) U.S. Cl.
  CPC ............. *G10K 11/172* (2013.01); *B32B 3/12* (2013.01); *G10K 11/168* (2013.01); *B32B 2307/10* (2013.01)

(58) Field of Classification Search
  CPC ...... G10K 11/168; G10K 11/172; B32B 3/12; B32B 2307/10
  USPC .......................... 181/210, 213, 214, 288, 292
  See application file for complete search history.

(56) References Cited

U.S. PATENT DOCUMENTS

| | | | | |
|---|---|---|---|---|
| 3,952,831 A * | 4/1976 | Bernard | .................... | B32B 3/12 181/292 |
| 5,785,919 A * | 7/1998 | Wilson | ................. | B29D 24/005 264/401 |
| 6,274,216 B1 * | 8/2001 | Gonidec | ................... | B32B 3/12 428/116 |
| 6,536,556 B2 * | 3/2003 | Porte | ........................ | B32B 3/12 181/284 |
| 7,464,790 B2 * | 12/2008 | Kodama | ................ | G10K 11/16 181/286 |
| 8,235,171 B2 * | 8/2012 | Douglas | ............... | G10K 11/172 181/292 |
| 8,408,358 B1 * | 4/2013 | Hermiller | ............... | F02K 1/827 181/229 |
| 9,275,622 B2 * | 3/2016 | Claeys | ................. | G10K 11/172 |
| 9,620,102 B1 * | 4/2017 | Ichihashi | ............... | B64D 33/02 |
| 2013/0025961 A1 | 1/2013 | Koh et al. | | |

(Continued)

OTHER PUBLICATIONS

Lu, K. et al; A lightweight low-frequency sound insulation membrane-type acoustic metamaterial AIP Advances 6, No. 2 (2016): 025116; doi: 10.1063/1.4942513.

(Continued)

*Primary Examiner* — Jeremy Luks
(74) *Attorney, Agent, or Firm* — Patti & Malvone Law Group, LLC

(57) ABSTRACT

An exemplary apparatus attenuates sound in a frequency range, e.g. audible frequencies. A resilient planar membrane has first and second honeycombs with unit cells attached to opposing sides of the planar membrane. Each unit cell has rigid walls extending perpendicular to the planar membrane. Buttresses are mounted inside the unit cells where dimensions of the buttresses result in an alteration of an attenuation versus frequency characteristic in the audible or other frequencies relative to an attenuation versus frequency characteristic without the buttresses.

15 Claims, 4 Drawing Sheets

(56) References Cited

U.S. PATENT DOCUMENTS

| | | | | |
|---|---|---|---|---|
| 2013/0171407 A1* | 7/2013 | Franzoi | ............... | F02C 7/045 |
| | | | | 428/116 |
| 2013/0251510 A1* | 9/2013 | Runyan | ............... | F01D 25/00 |
| | | | | 415/119 |
| 2014/0060962 A1 | 3/2014 | Sheng et al. | | |
| 2014/0116802 A1 | 5/2014 | Ma et al. | | |
| 2014/0339014 A1 | 11/2014 | Varanasi et al. | | |
| 2014/0371353 A1 | 12/2014 | Mitchell et al. | | |
| 2015/0086335 A1* | 3/2015 | Merlo | ............... | F02K 1/827 |
| | | | | 415/119 |
| 2016/0078857 A1 | 3/2016 | Sheng et al. | | |

OTHER PUBLICATIONS

Liu, X. N. et al; Wave propagation characterization and design of two-dimensional elastic chiral metacomposite; Journal of Sound and Vibration 330, No. 11 (2011): 2536-2553.

Su, Y. C. et al; Design of double negativity elastic metamaterial; International Journal of Smart and Nano Materials; vol. 6, No. 1 (2015): 61-72.

Chen, J. S. et al; Sound Attenuation of Membranes Loaded with Square Frame-shaped Masses; Department of Engineering Science, National Cheng kung University No. 1, University Road, Tainan City 701; Taiwan.

Cho, S. et al; Noise Control for Home Appliance Using Two-Dimensional Acoustic Metamaterial Panel Composed of Periodically Arranged Honeycomb Shaped Unit Cells; The 22nd International Congress on Sound and Vibration; florence, Italy; Jul. 12-16, 2015; ICSV22; pp. 1-3.

Zhang, H. et al; Ultra-thin smart acoustic metasurface for low-frequency sound insulation; Applied Physics Letters 108, No. 14 (2016): 141902; doi: 10.1063/1.4945664.

Sui, N. et al; A lightweight yet sound-proof honeycomb acoustic metamaterial; Citation: Applied Physics Letters 106, 171905 (2015); doi: 10.1063/1.4919235.

* cited by examiner

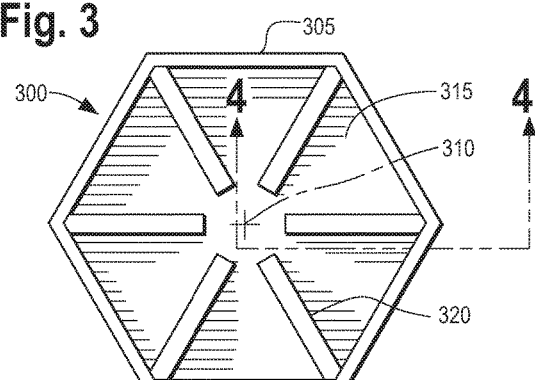
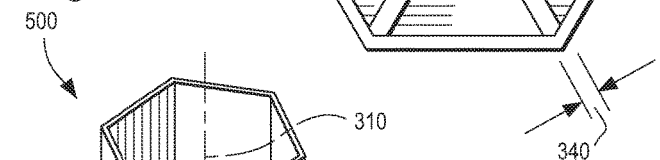
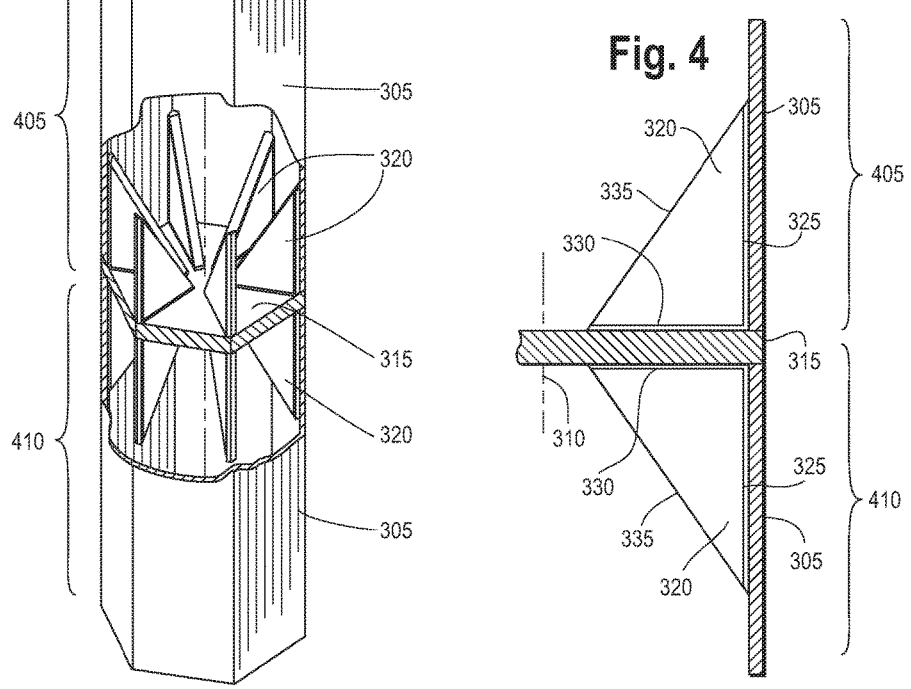

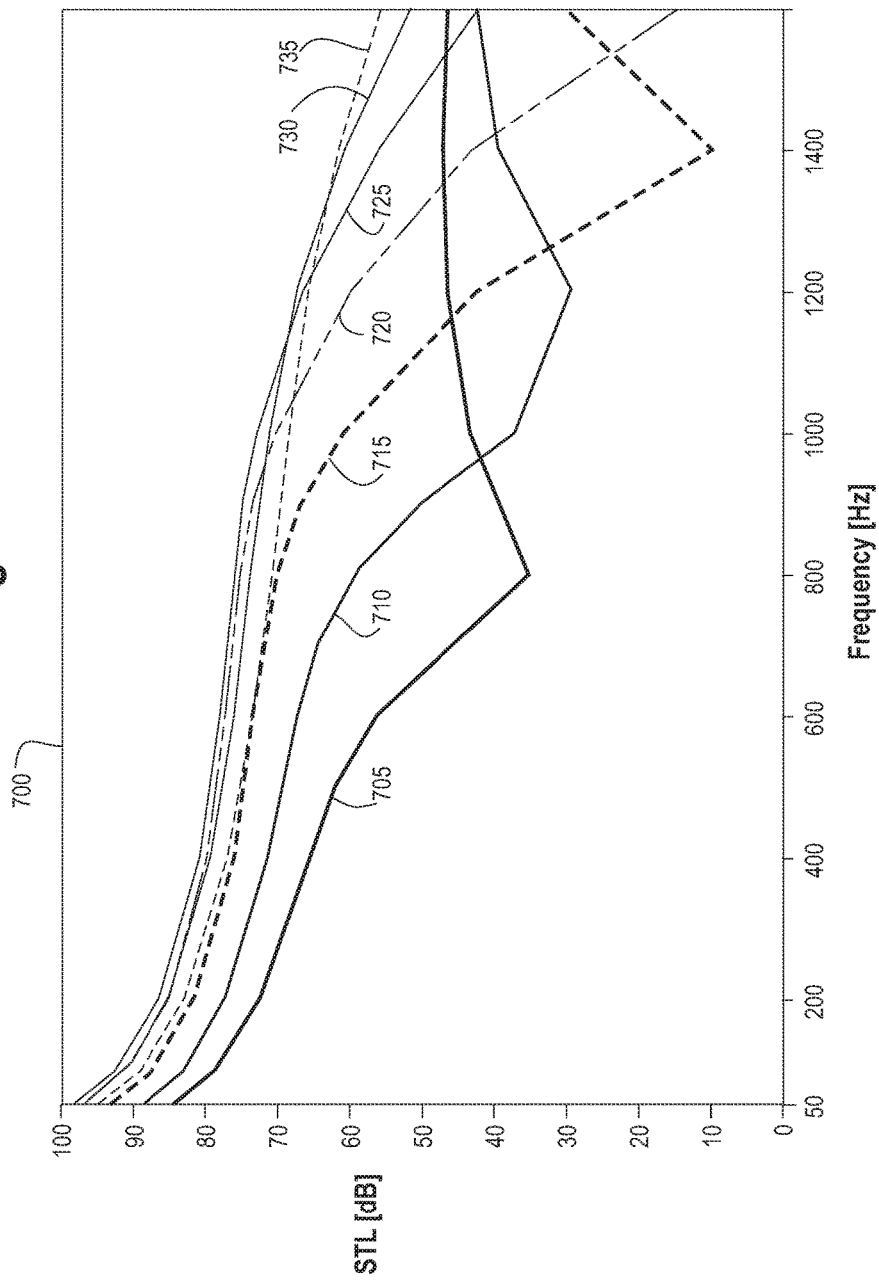

HONEYCOMB UNIT CELL ACOUSTIC METAMATERIAL WITH IN SITU BUTTRESSES FOR TUNED ACOUSTIC FREQUENCY ATTENUATION

BACKGROUND

This invention relates to lightweight structures that can provide substantial sound transmission loss (STL) for frequencies in the audible range especially at lower audible frequencies and more specifically to the use of buttresses in cells in a honeycomb to control STL versus frequency response.

Common materials provide sound attenuation explained by the "mass law" which holds that sound transmission through a material is proportional to the product of its density, thickness and the frequency of the sound. A representative assumption of the mass law indicates that a doubling of either mass or frequency through a partition would result in only a 6 dB reduction of SPL through the medium (or an STL of 6 dB). Thus, for sound at a given frequency, lightweight materials (low density) that are relatively thin would not be expected to exhibit significant sound transmission (low STL). Although lightweight honeycomb structures have been described that provide sound attenuation not predicted by the mass law, it would be desirable to control the sound attenuation versus frequency response, preferably without having to change the dimensions of the honeycomb cells.

SUMMARY

It is an object of the present invention, along with other objectives, to satisfy this desire.

An exemplary apparatus attenuates sound in the audible frequency range. A resilient planar membrane has first and second honeycombs with unit cells attached to opposing sides of the planar membrane. Each unit cell has rigid walls extending perpendicular to the planar membrane. Buttresses are mounted inside the unit cells where dimensions of the buttresses result in an alteration of an attenuation versus frequency characteristic in the audible frequencies relative to an attenuation versus frequency characteristic without the buttresses.

An exemplary method allows control of the sound transmission level versus frequency characteristic in the audible frequency range in a sound attenuation apparatus. A first honeycomb is attached to one surface of a resilient planar membrane and a second honeycomb attached to the other surface of the resilient planar membrane. Each of the first and second honeycombs have unit cells with rigid walls extending perpendicular to the planar membrane. Buttresses are dimensioned to control the sound transmission level versus frequency characteristic in the audible frequency range and are mounted to interior walls of the unit cells.

DESCRIPTION OF THE DRAWINGS

Features of exemplary implementations of the invention will become apparent from the description, the claims, and the accompanying drawings in which:

FIG. 3 is a representative top view of a cell in accordance with the present invention suited for use in a honeycomb of adjoining cells in which acoustic attenuation versus frequency response can be controlled.

FIG. 4 is a side view of the cell in accordance with FIG. 3 as seen from section 4-4.

FIG. 5 is a perspective view of an exemplary unit cell in accordance with the present invention.

FIG. 7 is another graph in accordance with the present invention showing STL versus frequency response for other embodiments of the present invention.

DETAILED DESCRIPTION

Figure 1:
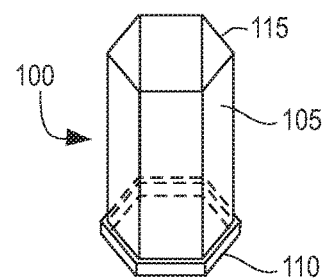
FIG. 1 shows a single prior art cell for use in a honeycomb of adjoining cells for providing acoustic attenuation.

FIG. 1 shows a single prior art cell 100 for use in a honeycomb of cells with adjoining sides for providing acoustic attenuation. The cell 100 consists of a hollow tube having a hexagonal cross-section with six walls 105 which are terminated at one end by a membrane 110 with the opposing end 115 being open. The walls 105 are made of a rigid material and the membrane 110 is made of a resilient material on the order of durometer 40A or some like durometer such as stiff rubber or latex.

Figure 2:
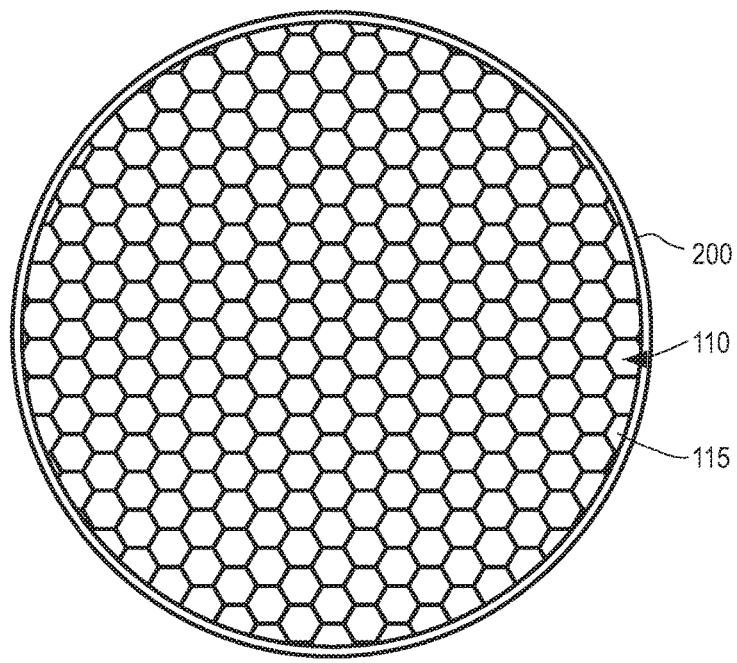
FIG. 2 shows a prior art honeycomb of adjoining cells or providing acoustic attenuation.

FIG. 2 shows a prior art honeycomb 200 of adjoining individual cells 100 for providing acoustic attenuation. The open ends of the individual cells 115 are closest to the viewer with the other ends of the individual cells terminated at and attached to the membrane 110. Significant STL levels in the audible and inaudible frequency ranges are possible for such a honeycomb dependent on the size of the unit cells, stiffness of the membrane structure, and the materials used.

FIGS. 3 and 4 show an exemplary cell 300 in accordance with an embodiment of the present invention suited for use in a honeycomb of cells with adjoining walls. The exemplary cell 300 consists of a hollow tube having a hexagonal cross-section of six walls 305 equally spaced from a centered longitudinal axis 310 and of equal length, i.e. the length of the cell. Although a hexagonal cross-section is especially suited for use in a honeycomb having high strength per unit weight, cells having other cross-sectional shapes could be utilized. A resilient membrane 315 is firmly attached to the distal edges of the walls 305 that form one end of the tube. Six exemplary buttresses 320 extend radially inward towards the axis 310. The exemplary buttresses are generally triangular solids in shape having one leg 325 that abuts and is mounted firmly to the interior intersection of adjacent walls 305. The length of leg 325 is the height of the buttress. The buttresses 320 each have a base leg 330 that is perpendicular to the axis 310 and is even with an end of the walls 305. The length of base 330 is referred to as the inward radius. The base 330 abuts and is firmly attached to the surface of membrane 315. The third leg 335 of each of the buttresses 320 extends from the distal ends of leg 325 and base leg 330. In this illustrative example, the leg 335 forms a straight line although other types of nonlinear paths could be utilized, e.g. smooth concave curves, exponential curves, etc. As seen in FIG. 3 the planar buttresses 320 have a thickness 340. As best seen in FIG. 4, each unit cell is formed of two back-to-back cells 300 each mounted to opposing surfaces of the planar membrane 315 in mirror image alignment. The respective edges of the walls 305 as well as the base legs 330 of buttresses 320 of each of the back-to-back cells are aligned to each other to form a mirror image.

A honeycomb of such unit cells may be constructed in a variety of techniques. For example, a planar membrane may be utilized that has an area that defines the area of the honeycomb itself. First assembly 405 of a plurality of honeycomb cells may be mounted to one surface of membrane 315 and a second assembly 410 of a plurality of honeycomb cells may be mounted to the opposing surface of membrane 315 in mirror image alignment with assembly 405. Each of the cell walls is rigid to substantially prevent the transmission of energy along the membrane to laterally adjacent neighboring cells. For example, the cell walls could be made of a hard plastic, metal or other suitable material. The membrane can be made of a soft, rubbery material so that the interior membrane in each cell receives and responds with transverse deflection to energy from incident pressure waves (sounds). For example, membrane could be made of a soft rubber of durometers of Shore A from 20 to 60, or other similar type of material. Each unit cell should not preferably propagate energy transversely to other adjacent unit cells. Each honeycomb of cells is preferably formed of a metamaterial that can be made by an additive manufacturing process. A metamaterial is defined as a material that gives properties not normally found in nature Parameters that specify effective mass density and bulk modulus for mechanical waves are analogous to that of permittivity and permeability for electromagnetic waves. These variables are manipulated to create a sub-wavelength (e.g. $\frac{1}{8}^{th}$ or smaller, for example) structure which modifies an acoustic wave or electromagnetic wave; it may have the ability to refract, deflect, or modify the wave in abnormally when compared to natural materials. An acoustic cloak is an example of an acoustic metamaterial that can redirect acoustic waves around objects. One exemplary honeycomb assembly having a thickness of 13 mm of metamaterial behaved acoustically as though it had a surface density of 0.28 kg/m2/mm.

FIG. 5 shows a single unit cell 500 consisting of back-to-back honeycomb cells 405 and 410 as previously explained. A honeycomb consisting of a plurality of unit cells 500 mounted laterally side to side to each other forms an exemplary embodiment used to provide attenuation of sound waves. A top (end) view of such a honeycomb will similar to the honeycomb shown in FIG. 2 except that the interior of each cell will include buttresses. The top/end of the exemplary honeycomb will be preferably mounted so that the longitudinal axis of the unit cells are aligned perpendicular to the sound source to be attenuated and mounted between the sound source and an area which will benefit from the tuned attenuation of the sound. Although usable at various frequencies, such tuned attenuation is especially useful at lower audible frequencies, e.g. below 250 Hz, where it is desirable to minimize sounds entering a space occupied by a person such as from an engine, propeller, rotor, or other source that emits sub 250 Hz undesired sound.

Figure 6:
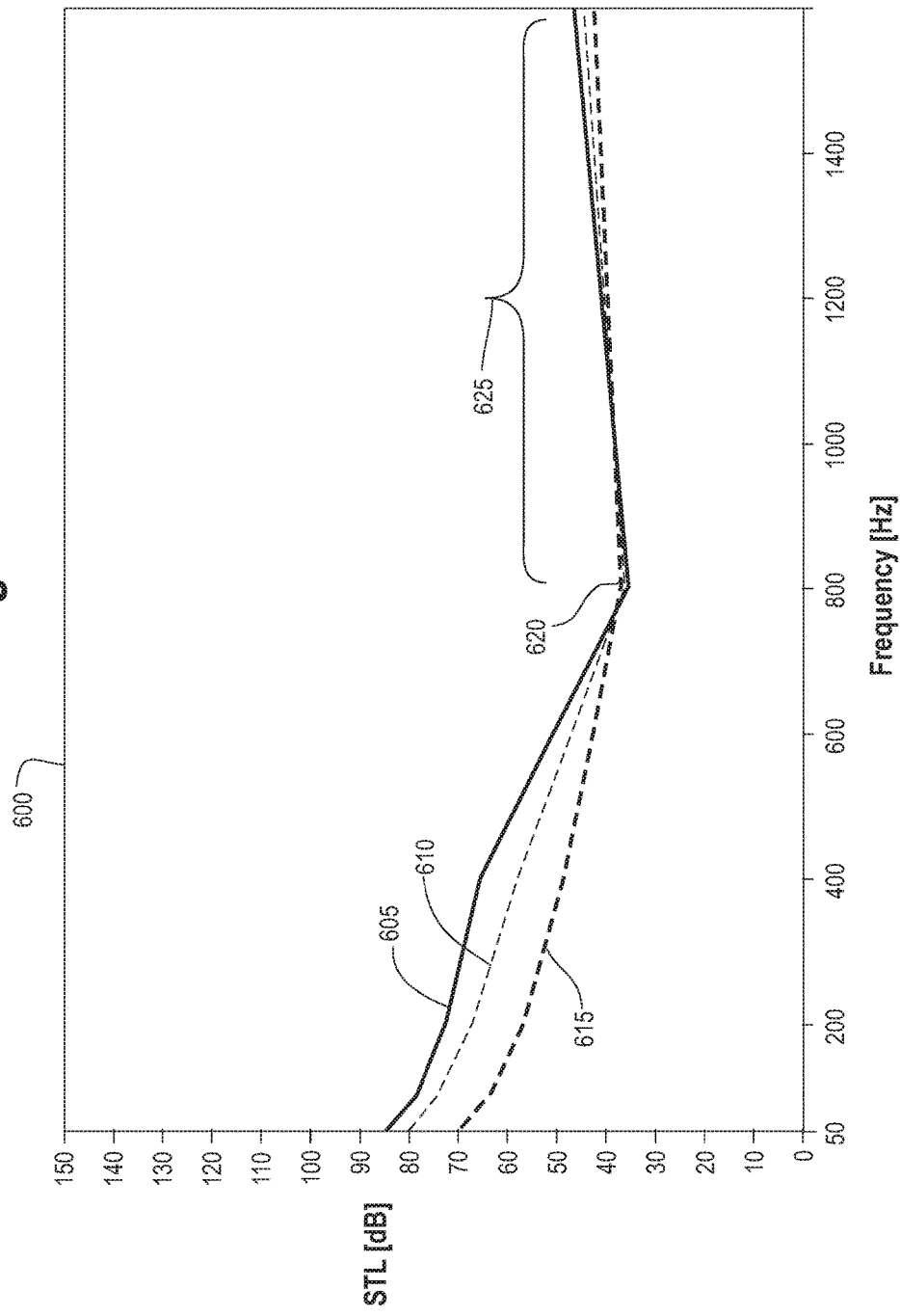
FIG. 6 is a graph in accordance with the present invention showing STL versus frequency response for different embodiments.

FIG. 6 is a graph 600 in accordance with the present invention showing STL values versus frequency for different embodiments. The vertical axis shows STL as measured in decibels (dB) and the horizontal axis shows frequencies ranging from 50 Hz-1600 Hz. Curves 605, 610 and 615 show STL versus frequency characteristics for three different embodiments. All three of the embodiments utilized hexagonal unit cells with a 2 mm diameter with walls 305 having a length of 6.35 mm for each side of the membrane; hence total height is two 6.35 mm values plus the 0.5 mm membrane, which is 13.2 mm. Similarly, all three embodiments had a buttress height (325) of 2.54 mm and an inward radius length (330) of 0.25 mm. Cell diameters are measured from the intersection of two walls through the axis to the opposing intersection of two walls. The three embodiments had variations based on the thickness of the buttresses with the embodiments corresponding to curves 605, 610 and 615 having a thickness of 0.03125 mm, 0.0625 mm and 0.125 mm, respectively. Thus, the buttress wall thicknesses doubled between 605 and 610 and doubled again between 610 and 615. All three buttresses had a linear (straight line) side 325. As shown in the graph 600, each of the three curves has a common inflection point 620 occurring at approximately 800 Hz representing a minimum STL value of approximately 35. It will be noted that the region between 800 Hz and 1600 Hz represents a relatively constant STL attenuation level for all three embodiments. The embodiment with the buttress having the thickest wall corresponding to curve 615 has shallower slope from 800 Hz to 50 Hz than curve 610 which in turn has shallower slope than curve 605. This shows that for relatively high (long) buttress heights relative to the length of the cells, e.g. >50% and up to 100%, the thickness of the buttresses can be selected to yield a relatively flat STL versus frequency characteristic. Those skilled in the art will appreciate that this offers substantial advantages in comparison to materials that provide attenuation that generally follows the mass law.

FIG. 7 is a graph 700 in accordance with the present invention showing STL versus frequency response for other embodiments of the present invention. Graph 700 is similar to graph 600 in that it shows STL levels on the vertical axis and frequency on the horizontal axis. The curves correspond to seven different embodiments of honeycombs having unit cells with buttresses of different dimensions. All seven embodiments have hexagonal unit cells having a diameter of 2 mm, cell wall length of 6.35 mm, buttress height of 2.54 mm and a buttress wall thickness of 0.03125 mm. All these buttresses had a linear (straight line) side 325. The curves 705, 710, 715, 720, 725, 730 and 735 correspond to embodiments with differing inward buttress radius (length of base 330) of 0.25 mm, 0.35 mm, 0.45 mm, 0.55 mm, 0.65 mm, 0.75 mm and 0.85 mm, respectively. All of the embodiments exhibit more than 80 dB of STL at 50 Hz. The embodiments corresponding to curves 705, 710 and 715 have inflection points at a minimum STL of 35 dB at 800 Hz, 30 dB at 1200 Hz and 10 dB at 1400 Hz, respectively. The embodiments corresponding to the other curves have inflection points greater than 1600 Hz that increase with a corresponding increase in buttress inward radius. One of skill in the art will understand and appreciate that a honeycomb structure utilizing unit cells of a given diameter and length can have the corresponding STL versus frequency characteristic altered by utilizing internal buttresses with corresponding different dimensions. This offers a substantial advantage in that only variations in buttress dimensions are required to generate a change in the STL versus frequency characteristic as opposed to changing the basic unit cell diameter and/or length.

For comparison, a honeycomb with unit cells as described in FIG. 7 but with no buttresses at all has an STL vs. frequency characteristic that would be illustrated by a curve that is substantially the same as curve 705 from 50 Hz to 400 Hz, and from 400 Hz to 1600 Hz is substantially a straight line ending at 52 dB at 1600 Hz. That is, no inflection points (at least within the shown frequency range) are present. The use of buttresses with selected dimensions enables sound passbands (low STL levels relative to higher STL levels at other frequencies) to be created at a desired frequency. Using buttresses of certain dimensions in some cells and buttresses of different dimensions in other cells within the same honeycomb could flatten the passband (area of inflection with lowest STL) to have a wider frequency range than where only one buttress dimension is used for all cells. For example, using buttress dimensions associated with curve 705 for half the cells in a honeycomb and buttress dimensions associated with curve 710 for the other half the cells in the honeycomb will yield a passband between 800 Hz-1200 Hz. The use of unit cells with larger diameters lowers the frequency of the infection points and hence the combination of larger diameter cells and buttresses with selected dimensions allows the inflection point (passband) to be shifted to lower frequencies than for the curves shown in FIG. 7. So, for example, if frequencies below 200 Hz were desired to be attenuated while passing significant voice frequencies, a honeycomb with unit cells having a passband starting at about 250 Hz and extending to higher frequencies, e.g. about 1200 Hz, could be used while providing substantial, e.g. greater than 25 dB, attenuation of frequencies below 200 Hz.

Characteristics have been determined that are relevant to acoustic performance, i.e. the amount of STL achieved at various frequencies. As cell diameters decrease, lower frequency STL values increase. The following has been observed for unit cells of 2 mm diameter and having a small inward buttress radial distance, e.g. about 25% of the distance between the center axis and the intersection of two hexagonal walls. For relatively low buttress heights, e.g. about 10% of the length of the cell, varying the thickness of the buttresses made almost no difference in the STL versus frequency characteristic. For medium buttress heights, e.g. about 50% of the length of the cell, varying the thickness of the buttresses made only a very small difference in the STL versus frequency characteristic, i.e. the curves were very similar and close together. For relatively large buttress heights, e.g. above 90% of the length of the cell, varying the thickness of the buttresses made a significant difference in the STL versus frequency characteristic as shown in FIG. 6.

The following has been observed for unit cells of 2 mm diameter and having a medium inward buttress radial distance, e.g. about 50% of the distance between the center axis and the intersection of two hexagonal walls, i.e. extending half the distance of the radial. For relatively low buttress heights, e.g. about 10% of the length of the cell, varying the thickness of the buttresses made almost no difference in the STL versus frequency characteristic. For medium buttress heights, e.g. about 50% of the length of the cell, varying the thickness of the buttresses resulted in relatively smooth, spaced apart curves with slightly more attenuation at the lower frequencies (50 Hz-200 Hz) with no points of inflection with slightly more attenuation for thinner thicknesses. For relatively large buttress heights, e.g. above 90% of the length cell, the characteristics changed significantly relative to the low and medium buttress heights, showing a significantly steeper slope from 50 Hz-1600 Hz, i.e. values of 70 dB 95 dB at 50 Hz and 8 dB 15 dB at 1600 Hz. The thinnest buttress wall thickness (0.03125 mm) showed an inflection point at approximately 800 Hz with a significantly increasing negative slope toward 1600 Hz. Additionally, between 50 Hz-1000 Hz, the difference between the embodiments with buttresses having the thinnest and thickest walls stayed between 20 dB-30 dB.

The following has been observed for unit cells of 2 mm diameter and having a large inward buttress radial distance, e.g. about 75% of the distance between the center axis and the intersection of two hexagonal walls. For relatively low buttress heights, e.g. about 10% of the length of the cell varying the thickness of the buttresses made almost no difference in the STL versus frequency characteristic. For medium buttress heights, e.g. about 50% of the length of the cell, varying the thickness of the buttresses resulted in relatively smooth, spaced apart curves with slightly more attenuation at the lower frequencies (50 Hz-200 Hz) with no points of inflection and with slightly more attenuation at greater thicknesses. For relatively large buttress heights, e.g. about 90% of the cell length, the characteristics changed significantly relative to the low and medium buttress heights, showing a gradual slope from 50 Hz-1600 Hz, i.e. values of 70 dB-100 dB at 50 Hz and 20 dB-50 dB at 1600 Hz. The curves were relatively evenly spaced apart with the curve corresponding to the embodiment with the thinnest buttress wall having about a 40 dB greater STL value than the curve corresponding to the embodiment with the thickest buttress wall.

Although exemplary implementations of the invention have been depicted and described in detail herein, it will be apparent to those skilled in the art that various modifications, additions, substitutions, and the like can be made without departing from the spirit of the invention. For example, adjusting membrane tension to alter STL properties within specific frequency regimes or using alternate unit cell geometries such as triangles, squares, diamonds, etc would all be mechanisms which would elicit similar results to those described herein. Although the above embodiments have STL characteristics shown in lower frequencies in the audible range, similar STL characteristics can be achieved at ultrasound and infrasound frequencies by using metamaterial honeycombs with buttresses that are dimensionally scaled for such frequencies. It may also be advantageous to make the whole structure transparent so people can see through it, but still reflect the sound. For example, transparent plastics could be used to make such embodiments that would block acoustic energy and provide a person on one side of the embodiment the ability to see through the embodiment (acting as window in an enclosed room) to view something on the other side, e.g. an operator could monitor levels or operation of a machine that is in an extremely noisy environment while providing the operator with a greatly reduced noise environment The scope of the invention is defined in the following claims.

The invention claimed is:

1. An apparatus for attenuating sound in the audible frequency range comprising:
   a resilient planar membrane;
   first and second honeycombs each having unit cells attached to opposing sides of the planar membrane, each unit cell having rigid walls extending perpendicular to the planar membrane;
   buttresses mounted inside at least some of the unit cells, dimensions of the buttresses resulting in an alteration of an attenuation versus frequency characteristic in the audible frequencies relative to an attenuation versus frequency characteristic without the buttresses; where the first honeycomb and its unit cells are mounted to the planar membrane in back-to-back alignment with the second honeycomb and its unit cells.

2. The apparatus of claim 1 where the buttresses include at least two planar buttresses each with one side abutting an interior wall of the unit cell and another side abutting the planar membrane.

3. The apparatus of claim 2 where the one side is perpendicular to the planar membrane and the another side parallel to the planar membrane and aligned along a radial from an axis of the unit cell.

4. The apparatus of claim 2 where the unit cells have a hexagon cross-section with six walls and six wall intersections, each unit cell including six planar buttresses with each buttress having one side abutting the respective six wall intersections and another side abutting the planar membrane.

5. The apparatus of claim 3 where the one side is greater than 50% of a length of the walls of the unit cell and the another side is less than 50% of a length of the radial from the axis of the unit cell to the interior wall of the unit cell resulting in a downward inflection in a sound transmission level versus frequency characteristic in the audible frequency range.

6. An apparatus for attenuating sound in the audible frequency range comprising:
a resilient planar membrane;
first honeycomb having unit cells attached to a side of the planar membrane, each unit cell having rigid walls extending perpendicular to the planar membrane;
a buttress mounted inside the unit cells for controlling an attenuation versus frequency characteristic in the audible frequency range based on the physical dimensions of the buttress; and further comprising a second honeycomb with unit cells mounted to the other side of the planar membrane, the second honeycomb and its unit cells being mounted to the planar membrane in back-to-back alignment with the first honeycomb and its unit cells.

7. The apparatus of claim 6 where the buttress includes planar buttresses each with one side abutting an interior wall of the unit cell and another side abutting the planar membrane.

8. The apparatus of claim 7 where the one side is perpendicular to the planar membrane and the another side parallel to the planar membrane and aligned along a radial from an axis of the unit cell.

9. The apparatus of claim 7 where the unit cells have a hexagon cross-section with six walls and six wall intersections, each unit cell including six planar buttresses with each buttress having one side abutting the respective six wall intersections and another side abutting the planar membrane.

10. The apparatus of claim 8 where the one side is greater than 50% of a length of the walls of the unit cell and the another side is less than 50% of a length of the radial from the axis of the unit cell to the wall of the unit cell resulting in a downward inflection in a sound transmission level versus frequency characteristic in the audible frequency range.

11. A method for controlling a sound transmission level versus frequency characteristic in the audible frequency range in a sound attenuation apparatus comprising the steps of:
attaching a first honeycomb to one surface of a resilient planar membrane and a second honeycomb to the other surface of the resilient planar membrane, each of the first and second honeycombs having unit cells having rigid walls extending perpendicular to the planar membrane;
dimensioning buttresses to control the sound transmission level versus frequency characteristic in the audible frequency range;
mounting buttresses to interior walls of the unit cells;
where the second honeycomb is mounted in back-to-back alignment to the first honeycomb.

12. The method of claim 11 where the buttresses include planar buttresses that are mounted with one side attached to the interior wall of the unit cell and another side attached to the planar membrane.

13. The method of claim 12 where the another side of the planar membranes are aligned along a radial from an axis of the unit cell.

14. The method of claim 12 where the unit cells have a hexagon cross-section with six walls and six wall intersections, six planar buttresses mounted in each unit cell with one side abutting the respective six wall intersections and another side abutting the planar membrane.

15. The method of claim 13 where the one side is greater than 50% of a length of the walls of the unit cell and the another side is less than 50% of a length of the radial from the axis of the unit cell to the wall of the unit cell resulting in a downward inflection in a sound transmission level versus frequency characteristic in the audible frequency range.

* * * * *